United States Patent [19]

Rasekhi et al.

[11] 4,415,906
[45] Nov. 15, 1983

[54] MAGNETIC RECORDING HEADS

[75] Inventors: Houshang Rasekhi, Convent Station, N.J.; Alfred M. Nelson, Redondo Beach, Calif.; James P. Johnston, Wharton, N.J.; Frederick A. Rupinski, Lyndhurst, N.J.; Walter B. Hatfield, Jr., Fair Haven, N.J.

[73] Assignee: Wang Laboratories, Inc., Lowell, Mass.

[21] Appl. No.: 284,045

[22] Filed: Jul. 17, 1981

[51] Int. Cl.³ .......................................... G01D 15/12
[52] U.S. Cl. .................................................. 346/74.5
[58] Field of Search ................... 346/74.5, 139 C, 155; 360/110, 114, 122, 126

[56] References Cited

U.S. PATENT DOCUMENTS

| | | | |
|---|---|---|---|
| 3,903,594 | 9/1975 | Koneval | 346/155 X |
| 4,025,927 | 5/1977 | Nelson | 346/74.5 |
| 4,058,814 | 11/1977 | Brown, Jr. et al. | 346/154 |
| 4,176,362 | 11/1979 | Nelson | 346/74.5 |

Primary Examiner—Thomas H. Tarcza

Attorney, Agent, or Firm—Michael H. Shanahan; Joseph E. Funk

[57] ABSTRACT

There is provided improvements in magnetic recording head arrangements, such as may employ multiplexing, which provide substantially higher speeds of recording and require fewer components. The recording head is comprised of a compact, four-layer laminate structure mountable on a supporting substrate, in which the entire array of recording elements forms a flexible, uniquely arranged first layer, the return paths of the recording elements comprise a flexible second layer which has the dual utility of substantially reducing the recording element circuit inductance, the third layer is a rigid printed circuit board structure providing a mount for the blocking diodes and the conductive paths of the associated multiplexing scheme, and the fourth layer is a ground plane located between the first and third layers and insulated therefrom for further reducing the inductance associated to the circuitry of the first layer and for substantially minimizing the circuit inductance of the third layer.

35 Claims, 14 Drawing Figures

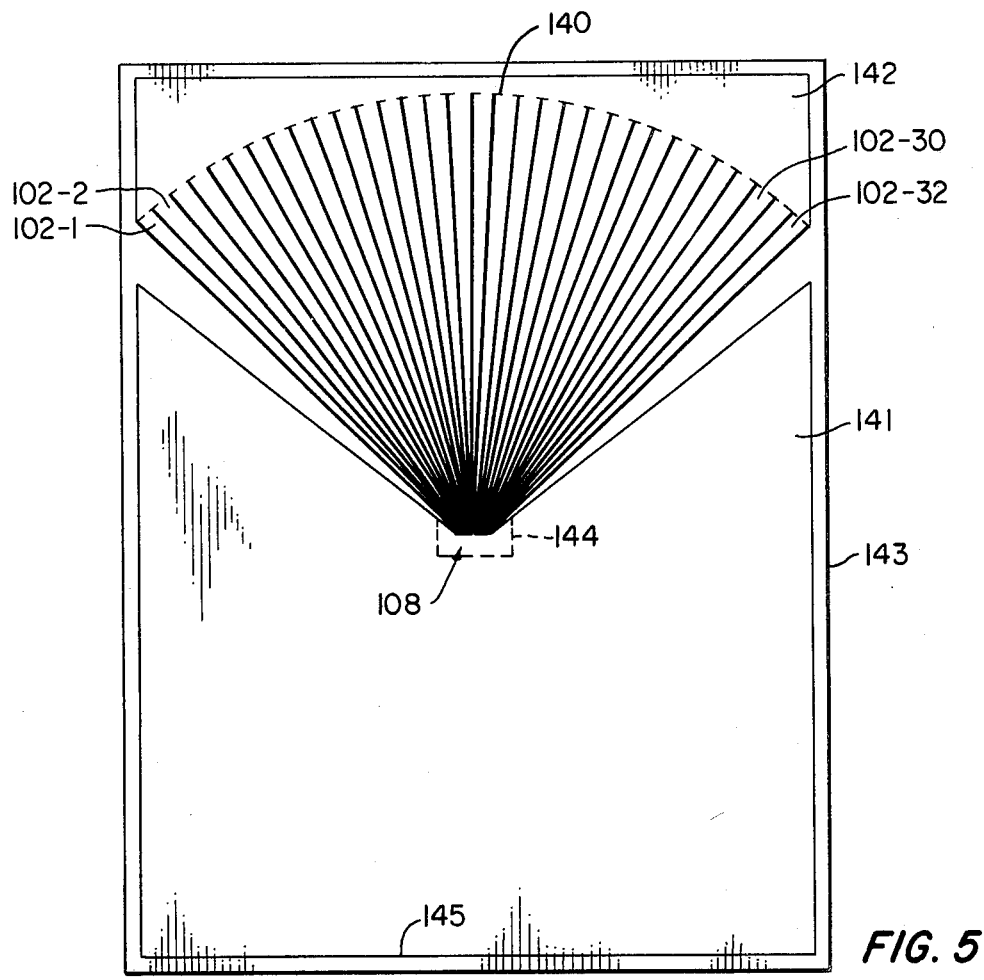
FIG. 5
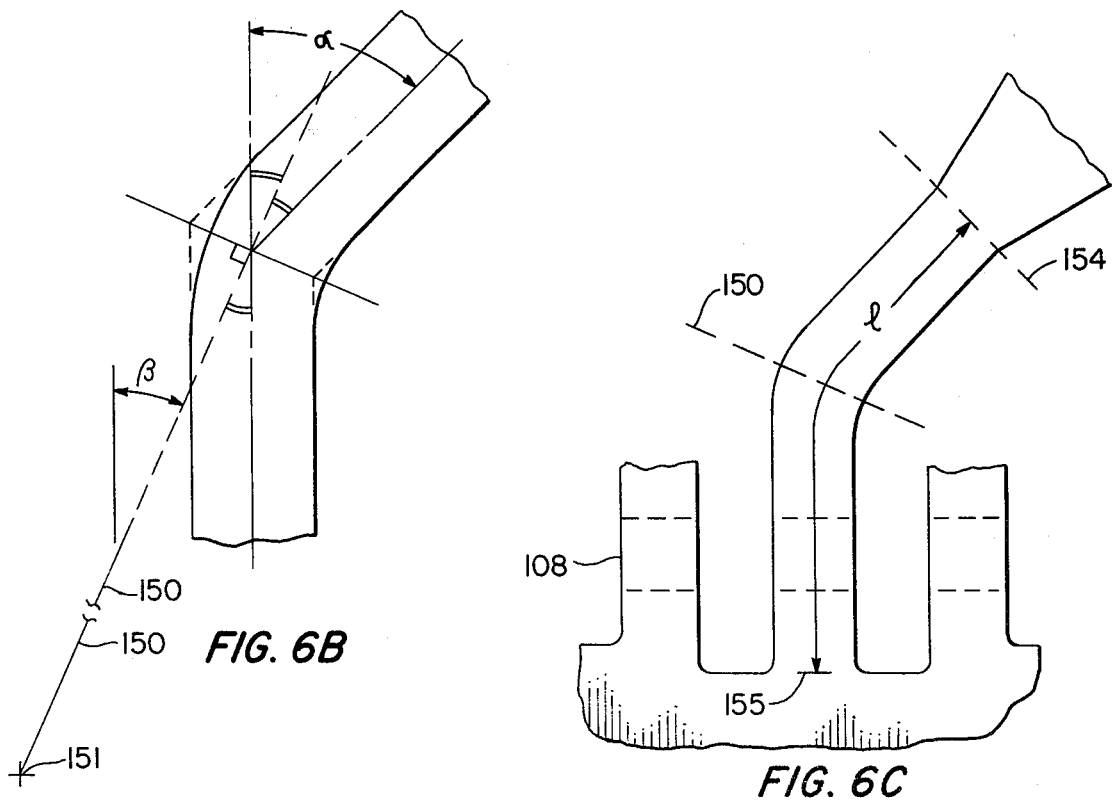
FIG. 6B
FIG. 6C

MAGNETIC RECORDING HEADS

BACKGROUND AND SUMMARY OF THE INVENTION

This invention relates to recording systems in magnetographic printing and more specifically to improvements in magnetic recording head arrangements, such as may employ multiplexing, which provide substantially higher speeds of recording and require fewer components.

This invention relates in particular to improvements in the recording head design described in U.S. Pat. No. 4,025,927 to Nelson and further relates to the recording system designs such as are described in U.S. Pat. No. 4,176,362 to Nelson.

In assessing the efficiency and reliability of a recording system, the combination of high recording speeds, with low power consumption (i.e. heat generated in the recording system, in particular in the minute recording zone areas of the recording elements) and minimal circuit components needed to generate and control the recording current pulses, is most important. It will be appreciated that the recording system time constant L/R (L and R are the electrical inductance and resistance respectively) is a primary parameter governing the efficiency of a recording system. Lower values of the L/R facilitate higher speeds of recording while lower R reduces the power consumption and heat generation. In the above-mentioned "362" and "927" patents, however, no particular impedance-reducing approach appears contemplated.

Moreover, while the teachings of the above-mentioned patents lend themselves to the design and fabrication of a recording system having a multiplicity of recording elements of very fine structure capable of high resolution magnetic recording, arranged in a linear array, such a recording system requires specially designed flat "blocking" diodes for the circuit arrangement providing multiplexing of the recording currents, which diodes are installed permanently between two specifically designed layers of contacts and conductors. In such a design when one or more of the diodes become defective, the replacement of the faulty diode(s) requires separation of these specially designed layers. Such a repair task becomes impractical especially when the layers are permanently epoxied or soldered together.

In a magnetic recording system having a multiplicity of recording elements without the benefit of a multiplexing scheme, every recording element would normally be controlled by at least a single switch to effect the recording of pixels. Such a system has the particularly severe drawback of requiring the direct connection of a separate and dedicated conductor, electronic switch, etc., to every recording element. This situation simply leads to the requirement for connecting numerous wires to the recording head. In a high resolution recording system with many recording elements per unit length (e.g. 250 per inch), the availability of space for the connecting sites becomes of great concern. Further, the task of actually reliably connecting and maintaining so many conductors within or in dealing with such a small dimension becomes an additional grave concern and leads to commercial impracticality.

To reduce the number of conductors and connections to the recording head, it is well known in this art to adopt a multiplexing scheme. In such a scheme the total number of connections made to the recording head is on the order of N+n, where N is the number of the groups of recording elements and n is the number of the recording elements within a group. However, multiplexing schemes require the addition of a current-blocking diode in series with each recording element, and these components must be associated with the recording head structure itself (to reduce the number of leads to the recording head), and thus are intimately related to the severely restricted dimensional requirements of the array of recording elements itself. Therefore, with the total number of diodes added to the recording system being N+n, the availability of space for installing so many components in a necessarily close distance from the recording element array, and which must nevertheless be accessible for maintenance, becomes of great concern.

In high-quality magnetographic recording, one of the most desired features of the recording system is its ability to record magnetic latent pixels on a magnetic medium uniformly such that the size of the recorded dots and the resultant forces between the toner particles and the magnetic medium are substantially uniform. It will be appreciated that this highly desired feature can be accomplished by: (1) fabricating the record head in such a way that the geometry of each of the recording elements, particularly at the recording zone, is substantially the same (i.e. of substantially equal dimensions); and (2) ensuring that the magnitude of the recording current pulses to be applied to the recording elements is substantially unvarying from element to element (i.e. in a high-quality recording system not more than ±10% variation in the amplitude of the recording current would be tolerable).

In a high speed recording system, variations in the circuit resistance and inductance can easily introduce intolerable variations in the amplitude of the recording currents, and thus becomes of additional concern. Because the circuit impedance and resistance of a recording system is directly related to the size, separation, length, and the type of the materials utilized in the design and construction of the conductive paths, etc., of the system, the structural design of a recording system with a multiplicity of recording elements for high quality, high speed recording is critical.

As a final consideration, the array of recording elements in particular must provide substantial uniformity from element to element, not only electrically (i.e. as to resistance and inductance), but especially geometrically at and in the vicinity of the recording zone, as otherwise uniformity of pixel size from element to element cannot be achieved. When the minute structure of the recording elements, especially at the recording zones, is fully considered it can be appreciated that very small variations in resistance or conductive path geometry will inevitably lead to non-uniformity of pixel recording. Thus, the cross-sectional dimensions of the recording elements at and in the vicinity of the recording zones, in particular, need to be geometrically and resistively uniform. At the same time the conductive path of each recording element needs to be enlarged as it extends away from the recording zone to a point where it is large enough to be conveniently connectable to the recording circuitry.

What is needed, therefore, is an improved magnetic recording system having a multiplicity of recording elements for high speed and high quality commercial utilization, with uniformity of recording from recording element to recording element and from recorded pixel to recorded pixel and the aforementioned concerns favorably resolved, and such is the principal object of this invention.

In accordance with the invention this need is solved by an integral structure within a recording system which comprises a first member defining a multiplicity of recording elements arranged substantially in parallel with one another, each recording element having a defined recording zone of minute size forming a part of a first surface of said first member, with the recording zones of said recording elements being predeterminably arranged relative to one another; and a second member having a first surface which is contiguous at least in part with said first member and including means for mounting at least a portion of the components comprising the recording circuitry, wherein the electrical resistance and inductance within said integral structure is substantially the same for each recording element.

The invention provides a compact, four-layer laminate structure mountable on a supporting substrate, in which the entire array of recording elements forms a flexible, uniquely arranged first layer, the return paths of the recording elements comprise a flexible second layer which has the dual utility of substantially reducing the recording element circuit inductance, the third layer is a rigid printed circuit board structure providing a mount for the blocking diodes and the conductive paths of the associated multiplexing scheme, and the fourth layer is a ground plane located between the first and third layers and insulated therefrom for further reducing the inductance associated to the circuitry of the first layer and for substantially minimizing the circuit inductance of the third layer.

In addition to providing substantially uniform circuit inductance and resistance from recording element to recording element, an arrangement according to the invention integrates the printed circuit board into the laminated structure, thus eliminating separate pieces which have to be connected (e.g. by soldering). As such, the process of fabricating such a structure into a one-piece assembly can now be fully automated particularly as to the etching of the individual layers, laminating the layers together, and inserting and making electrical connections to the components. The assembly fully lends itself to inexpensive, multiplexable, direct-drive arrangements (as opposed, for example, to transformer-coupled drive arrangements).

BRIEF DESCRIPTION OF DRAWINGS

The above-mentioned objects and features of the invention will become better understood by reference to the following detailed description, taken in conjunction with the accompanying drawings, in which:

FIG. 5 is a top view of a first construction of the recording element bi-metal layer of FIGS. 2 through 4 in a symmetical, single-sided fan configuration;

FIG. 6B is a further enlarged view of a portion of a single recording element of FIG. 5;

FIG. 6C is a further enlarged view of a portion of the recording zone area of the configuration of FIG. 5;

DESCRIPTION OF THE PREFERRED EMBODIMENTS

Figure 1:
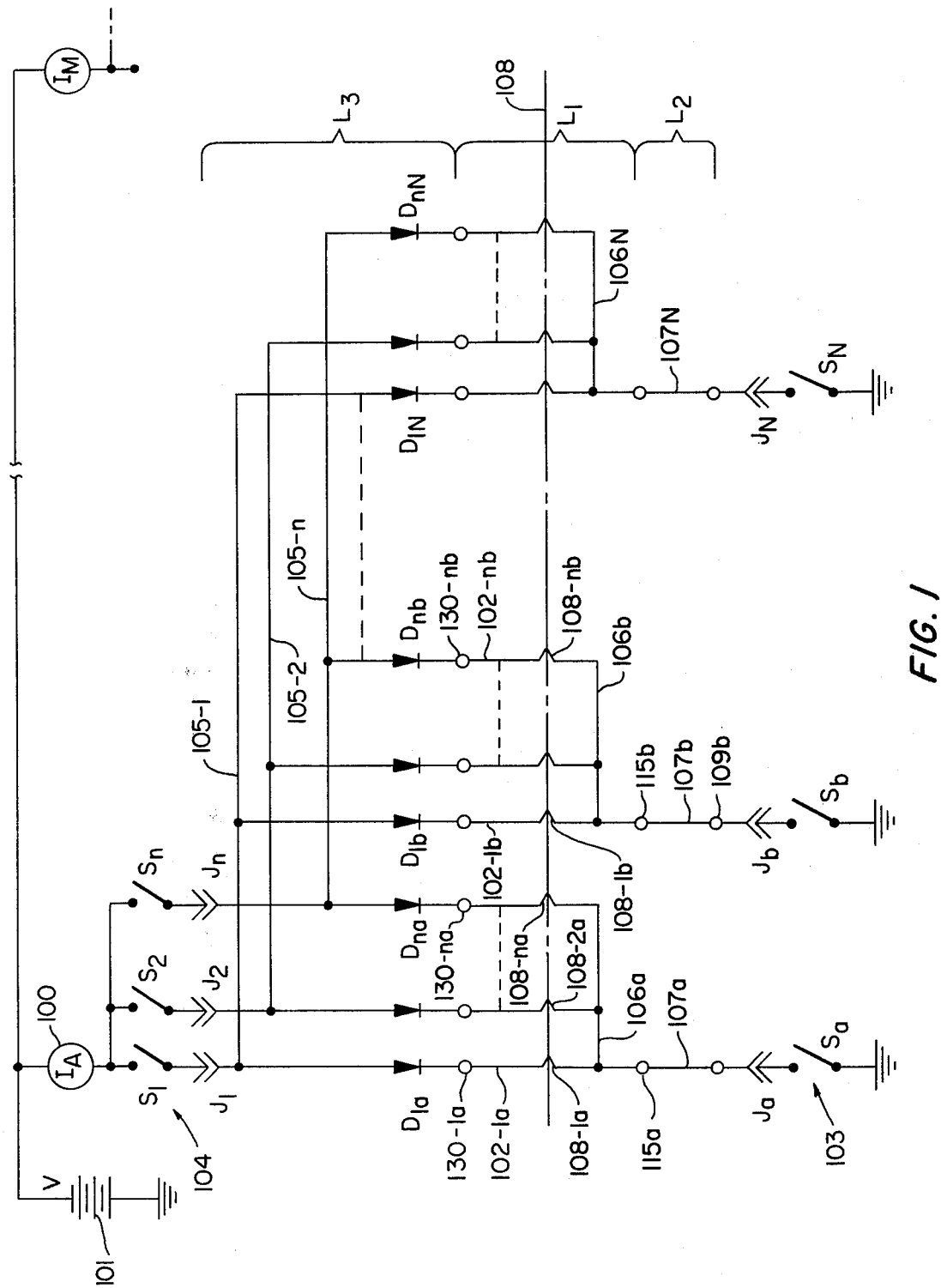
FIG. 1 is a schematic diagram of the recording circuitry of a recording system as it relates to the recording head structure in accordance with the invention.

FIG. 1 depicts via a circuit diagram the recording system of the present invention in a multiplexing scheme. Required recording current I is regulated and supplied by high-speed, electronic constant current sources $I_A, I_B, \ldots I_M$, which, as shown, are energized by a power supply 101. The recording of a magnetic latent pixel on a recording medium is effected by routing the recording current I through the selected recording element as governed by a switch from each of two switch groups $S_n$ and $S_N$. For example, the recording element having recording zone 108-1b is excited by closing switches $S_1$ and $S_b$. Generally, as shown in FIG. 1, there are "N" groups of "n" recording elements that are energized by a single current source 100. A recording group can be addressed by closing its group switch 103 and a recording element of this group can be then energized by closing its element switch 104. In such a scheme the recording of pixels basically occurs one at a time.

To ensure that the path of the recording current is uniquely defined and the flow of current into other recording elements is prevented during the recording of a pixel, current blocking diodes $D_{1a}, D_{2a} \ldots D_{nN}$ are inserted in the current path of every recording element.

Without these blocking diodes, when a recording element, say the element having recording zone 108-1a as example, is energized a portion of the current could divert via the associated buss conductor 105-1. This diverted current becomes distributed throughout the groups via the recording elements having recording zones 108-1b, 108-1c . . . 108-1N and would feed back into the elements of group "a" through the various other recording elements of groups "b", "c" . . . "n", and buss conductors 105-2, 105-3 . . . 105-n.

The passive part of the within-depicted recording system comprises essentially three printed circuit layers $L_1$, $L_2$ and $L_3$ which are assembled together in a laminate structure via an suitable adhesive. As illustrated in FIG. 1, layer $L_1$ comprises the recording elements for every recording group, which elements in turn are comprised of substantially parallel conductive paths (or "fingers"), 102-1a, 102-2a, . . . 102-nN, recording zones 108-1a . . . 108-nN, and conductors 106a . . . 106N. Layer $L_1$ thus defines the actual recording area portion of the system electrically illustrated in FIG. 1 between connections 130 and 115.

The configuration of the recording elements comprising layer $L_1$ may take any one of the forms described in U.S. Pat. No. 4,025,927 or U.S. patent application Ser. No. 268,934, filed June 1, 1981, as to the recording zone area itself and any one of the forms herein described with regard to the overall recording elements portion of the recording system. As such, layer $L_1$ provides a common buss (say 106a) for each group (say group "a") of recording elements.

Layer $L_2$, which like layer $L_1$ is a flexible structure, contains the group common returns 107 which are in electrical contact with the respective common busses 106 and the pins Ja, Jb . . . NJ of a multiterminal connector. Layer $L_3$, a rigid printed circuit board structure, is comprised of the buss conductors 105 leading to the blocking diodes D, and includes the multiterminal connector of the terminals $J_1$, $J_2$ . . . Jn and Ja, Jb . . . JN as well as provisions for mounting and supporting the diodes.

In detailing a current path through a specific recording element, say the recording element having recording zone 108-1a, to effect the recording of a latent magnetic pixel on a suitable recording medium, group switch $S_a$ and recording element switch $S_1$ have to be closed. Current thus is able to flow from constant current source $I_A$, through switch $S_1$ and jack $J_1$ of the multi-terminal connector into the recording head structure comprising the aforesaid three-layer laminate structure ($L_1$, $L_2$, $L_3$). The current is directed in the rigid printed circuit board structure comprising layer $L_3$ to, through and thereafter away from diode D1a. The current path then extends to the bi-metal layer $L_1$, there to flow through the respective finger portion 102-1a of the substantially parallel recording element grouping, and through the associated recording zone 108-1a. The recording element terminates in a common portion 106a of the bi-metal layer $L_1$ which is shared by all of those recording elements belonging to that group (i.e. those recording elements having recording zones 108-2a . . . 108-na). From there the common buss 106a electrically connects to a common return 107a, which, like the other common returns 107b . . . 107N, forms a part of layer $L_2$. The return 107a leads again to the multiterminal connector and the current path thus exits the recording head structure via Jack $J_a$ and group switch $S_a$ to ground.

Figure 2:
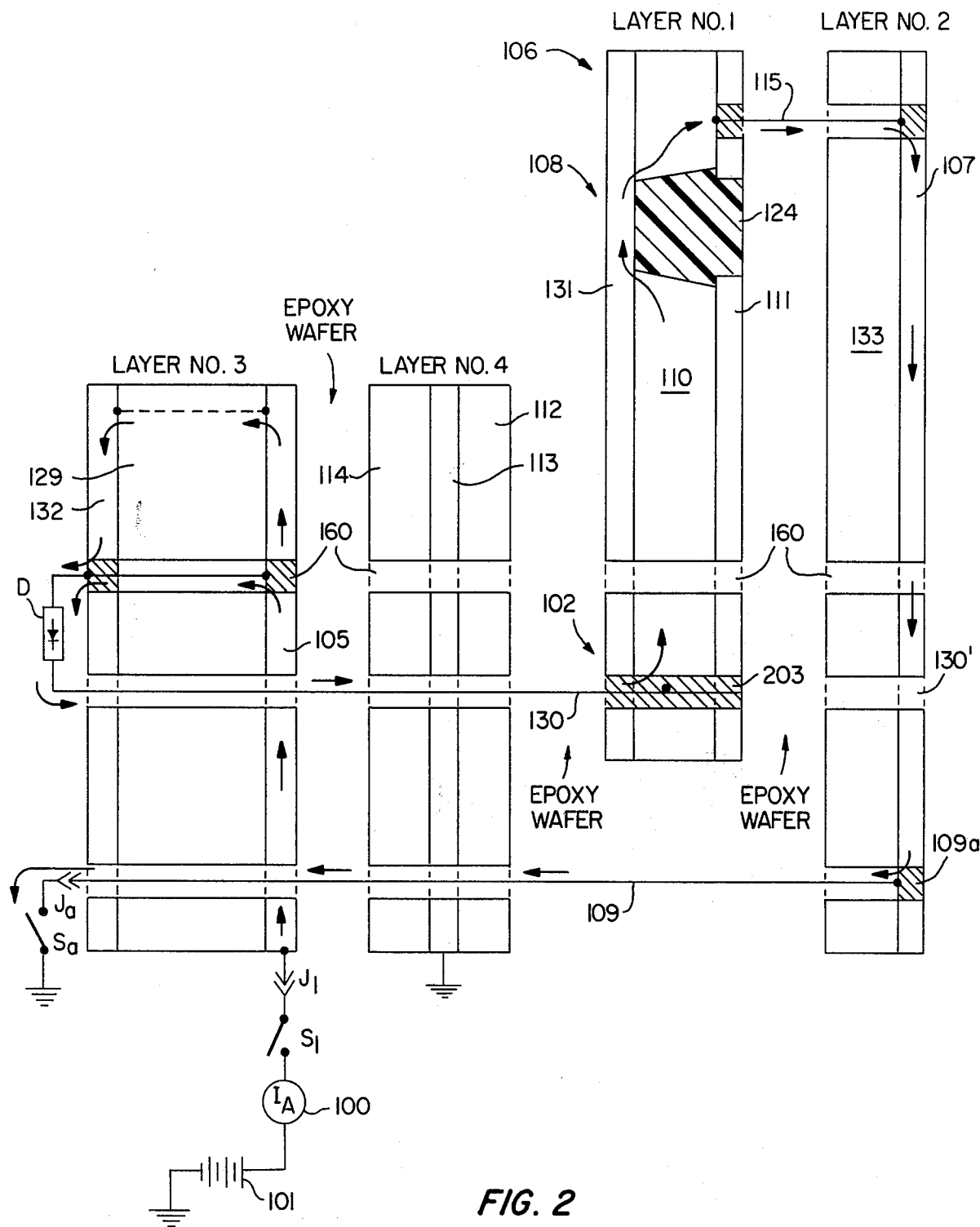
FIG. 2 is an exploded schematic block diagram conceptually illustrating the individual layers comprising the recording head structure according to the invention and a typical complete "write" current path through the laminated structure.

FIG. 2 conceptually shows the layered construction of the recording head structure of the recording system in further detail. Layer $L_1$, i.e. the bi-metal flexible circuit, is a sandwich consisting of a first nickel surface sub-layer 131 approximately $0.5 \times 10^{-3}$ inches thick, a copper sub-layer 110 approximately $1.5 \times 10^{-3}$ inches thick, and a second nickel surface sub-layer 111 approximately $0.5 \times 10^{-3}$ inches thick (see U.S. Pat. No. 4,025,927 for further detail). At the recording zones 108 and behind surface nickel layer 131 there is deposited a material 124, such as a magnetic-pigmented epoxy, which is intended to reduce the magnetic reluctance of the "write" circuit and thereby allow lower writing current (This effect is further described in U.S. Patent application Ser. No. 268,934 mentioned hereinabove). As illustrated, layer $L_1$ is sandwiched between and epoxied to layer $L_2$ and a layer $L_4$ (described hereinbelow).

Flexible layer $L_2$, constitutes a copper-clad Kapton sheet, i.e. a Kapton substrate 133 having a printed sub-layer of copper comprising common returns 107. Layer $L_2$ thus provides respective current-carrying paths for the various recording element groups. Sub-layer 107 is situated as closely to the bi-metal sheet $L_1$ as possible in order to minimize the circuit inductances associated to this part of the recording head structure, and yet the conductive paths thereof are configured to provide uniformity as to the inductance and resistance from recording element to recording element (thus ensuring uniform pixel size). It should be noted that in a fast current pulsing network such as the recording system depicted herein, the time constant L/R can be a significant factor in defining the ultimate recording speed of the system. The reduction of the circuit inductance thus results in a more efficient system with higher speed and fewer circuit components which in turn increases the reliability of the system.

While it is noted that the depicted construction of layer $L_1$ herein provides for a nickel backing sub-layer 111, as suggested in U.S. Pat. No. 4,025,927 and/or the aforementioned U.S. patent application Ser. No. 268,934, this layer is not functionally necessary for the recording element construction to effectively operate. Experimentally it has been shown that elimination of this nickel sublayer layer 111 will further lower (by several times) the circuit inductance.

Layer $L_4$ is like layer $L_2$, a Kapton/copper structure comprising, however, a continuous sheet of copper 113, sandwiched between Kapton sub-layers 112 and 114. Copper sub-layer 113 constitutes a ground plane insulated from layers $L_1$ and $L_3$ via Kapton sub-layers 112 and 114. It is situated as closely as practically possible to the conducting paths of sub-layer 105 of layer $L_3$ and also to layer $L_1$, to further reduce the circuit inductance associated to the latter and to particularly minimize the circuit inductance associated to the portion of the circuitry comprising sub-layer 105 of layer $L_3$. Experimentatally, it has been shown that the introduction of layer $L_4$ can reduce the inductance of the recording head structure up to 50%. Accordingly, the recording speed can be substantially increased. Recording pulses with 400 nanosecond duration with a peak current amplitude of ten amperes have been achieved.

The effectiveness of copper sheet 113 in reducing circuit inductance can be explained as follows. A time varying recording pulse di/dt generates a time varying magnetic field $d\phi/dt$ around the conductor 110 (and also conductors 111 and 131 to an extent). The field $d\phi_1/dt$ will interact with the copper sheet 113 and induce a potential within 113 which in turn set up an internal secondary electrical current in 113. The time varying magnetic field $d\phi_2/dt$ due to this secondary current will have a cancelling effect on $d\phi_1/dt$ which results in the reduction of the overall $d\phi/dt$ around the conductors of layer $L_1$. One can observe that the reduction in the circuit inductance L derives from the reduction in $d\phi/dt$ since inductance in a substantially linear system is related to $d\phi/dt$ by the relation $$L = (d\phi/dt)/(di/dt).$$

Therefore, a decrease in $d\phi/dt$ for a given $di/dt$ causes a reduction in L.

As shown in FIG. 2, consistant with FIG. 1, the recording current I is input to the first surface copper sub-layer 105 deposited on the rigid sub-layer 129 (e.g. epoxy glass) of printed circuit board layer $L_3$ via constant current source $I_A$, switch $S_1$ and board terminal $J_1$, as example. Copper layer 105, in constituting the buss conductors for the blocking diodes D, routes the current into the appropriate diode of the preselected recording element. The other surface of rigid sub-layer 129 also has deposited thereon printed conductive paths, illustrated in FIG. 2 as surface sub-layer 132, which are specifically dimensioned and located, and connected to certain ones of the conductor paths 105 to ensure uniformity of inductive impedance for each recording element circuit path in Layer $L_3$ regardless of where its associated diode D is physically located. The connections between surface sub-layers 105 and 132 through rigid sub-layer 129 are indicated in FIG. 2 by a dashed line in layer $L_3$. The purpose of such additional sub-layer conductive paths 132 is to provide paths in parallel with the conductive paths 105 in order to achieve uniformity of impedance. Thus as shown in FIG. 2, the depicted recording element circuit path from $J_1$ to its associated diode D is via a parallel conductive path network utilizing both sub-layers 105 and 132. The blocking diode D is by its own lead 130 directly connected to the bi-metal layer $L_1$ and thus routes the current into the bi-metal layer. The recording current is thereby directed through the selected recording zone 108 to the common buss 106 associated thereto which in turn is directly connected via a solder joint 115 to common return 107. The current path from return 107 leaves the recording head structure via conductor 109 and jack $J_a$ of the multi-pin connector associated to the printed circuit board layer $L_3$. Jack $J_a$ in turn leads to ground through the appropriate group switch $S_a$.

Figure 3:
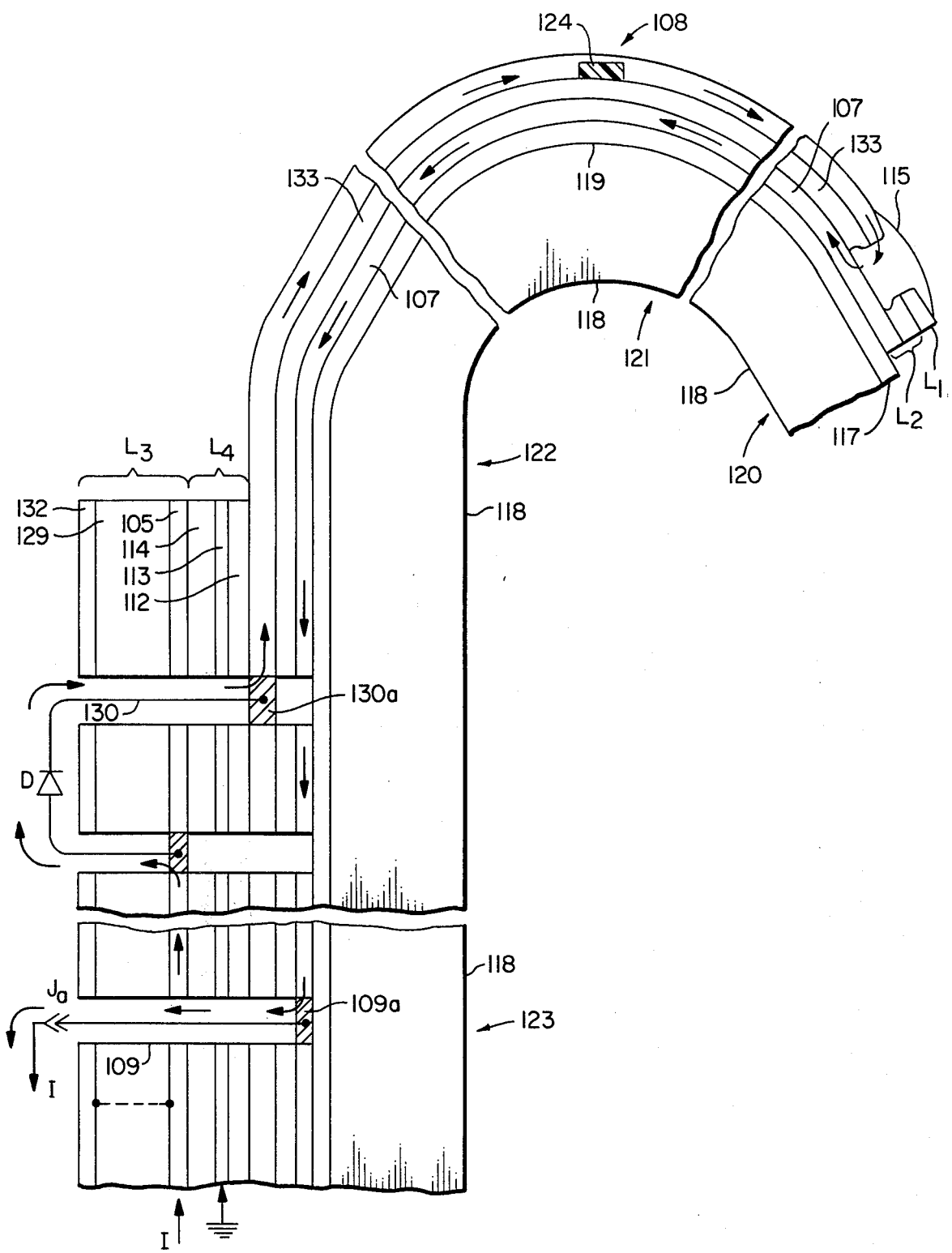
FIG. 3 illustrates in an enlarged partial schematic side view, the assembled laminate-structure recording head in accordance with the invention, again setting forth the complete conductive path within the recording head for one of the recording elements.

FIG. 3 conceptually illustrates in cross-sectional side view the passive portion of the recording system assembled with a supporting mandrel 118, and electrically insulated therefrom (in the case of a conductive mandrel) via an insulating layer 117. Each of the major layers are detailed in FIG. 3 as to their sublayers with the exception of layer $L_1$. As shown, the flexible layers $L_1$ and $L_2$ are conformably wrapped over a convexly-curved surface 119 of the mandrel. In order to conveniently show the layered arrangement, four enlarged sections 120, 121, 122 and 123 are illustrated. Section 120 includes the solder connection 115 connecting the common of a group of recording elements of the bi-metal layer $L_1$ to the common return buss sub-layer 107 of $L_2$. Section 121 depicts the recording zone 108 of a recording element situated atop the curved surface 119, thus allowing the magnetic medium to assume initmate contact with the recording zone.

Sections 122 and 123 illustrate the full four-layered arrangement portion of the recording head structure. Section 122 shows in particular the connections provided by the actual leads (e.g. 130) of a blocking diode D. Section 123 shows in particular the connection to the group common return terminal 109 and the input-output paths of the recording current I. Throughout the structure, the entire circuit path for a recording element is indicated by the current flow arrows provided.

As an alternative to the arrangement depicted in FIG. 3, common return layer $L_2$ could be provided on the back or underside of the mandrel 118 for a mandrel structure of appropriate thinness and material. In such an arrangement the current path from the common portion of the recording element would electrically connect via a solder joint, like 115, through the mandrel to layer $L_2$ on the underside thereof, which in turn would electrically connect to the printed circuit board pin of the associated jack J which likewise penetrates from the layered structure through the mandrel.

Figure 4:
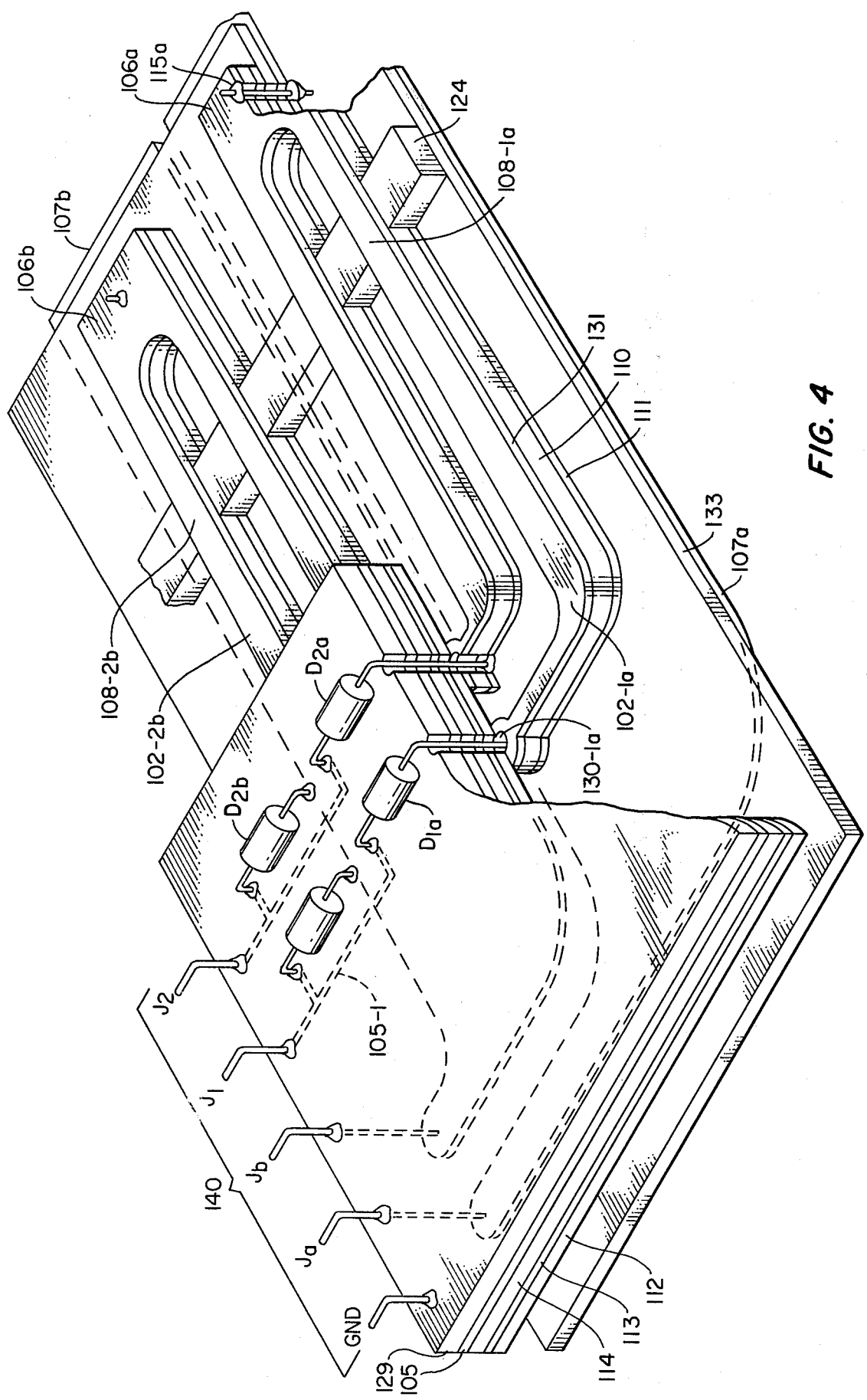
FIG. 4 is a breakaway perspective view of the recording head's assembled four-layer laminate construction, illustrating in particular the component mounting and the physical and geometrical relationship of the various layers to one another.

FIG. 4 depicts in a breakaway perspective view the assembled four-layer laminate construction of the recording head in accordance with the invention. In particular, the relationships of two groups of two recording elements, i.e. 1a, 2a and 1b, 2b, with the rest of the recording head circuitry and the layer structures per se are illustrated.

As has been mentioned previously, layer $L_3$ is generally made from a rigid printed circuit board material to support the multiple pin connector and the diodes, and such structure is depicted in FIG. 4. The related reference designators utilized in FIGS. 1 through 3 are retained in FIG. 4.

The recording current enters either of the terminals $J_1$ or $J_2$ of the multi-terminal connector 140 of the rigid printed circuit board layer $L_3$, and exits through the terminals $J_a$ or $J_b$ of said connector. The ground terminal, GND, of the multiterminal connector connects the ground plane 113 of layer $L_4$ to the reference ground to facilitate its inductance-reducing interaction with the sub-layer 105 (FIG. 2) in particular. Although not shown, the ground plane 113 is, via said ground connection, also connected to a second ground plane disposed proximate to a remotely-located board housing the remainder of the recording system's driving circuitry, i.e. the the electronic switches $S_n$, $S_N$, etc., and the associated conductive paths. It will be appreciated that the connection of the ground plane 113 of the record head structure to its counterpart associated with the driving circuit board, facilitates circulation of the induction current from one to the other which effects further reduction of the circuit inductance.

Assuming that the switches corresponding with the terminals $J_1$ and $J_a$ are closed, the recording current entering at $J_1$ passes through the buss conductor 105-1 and enters the diode D1a and via the soldering point 130-1a progresses to the recording element layer $L_1$ and in particular to the recording element defined by the conductive finger portion 102-1a and recording zone 108-1a. At the recording zone 108-1a the current is concentrated and brought closer to the magnetic medium (as more particularly described for example in the aforementioned U.S. Pat. No. 4,025,927). The inducing magnetic field caused by this concentrated recording current interacts with the magnetic medium and also the special high permeability magnetic material 124.

The latter is situated in the recording zone (see FIG. 2 for schematic cross-sectional view) to reduce the magnetic reluctance of the magnetic circuit which in turn enables a reduction in the magnitude of the recording current. The interaction of the inducing magnetic field with the magnetic medium results in creating a magnetic latent pixel on the medium. The current leaves the recording zone eventually to reach terminal $J_a$ via the common buss 106a, the pin-solder connection 115a, and the common return conductor 107a. FIG. 5 shows a top view of a bi-metal layer $L_1$ configuration designed for thirty-two recording elements. The recording zone 108 is terminated to a relatively large common conductor 141 which is the common return of the parallelly-running recording element fingers 102-1 . . . 102-32 that are symmetrically radially fanned out and temporarily physically terminated to the conductive portion 142. As is shown in FIG. 5, the common conductor portion 141 is attached to the rest of the bi-metal foil constituting the recording element fingers via the recording zones which are quite fragile and vulnerable and can easily be permanently damaged. In order to provide a support to the recording zone area the top and bottom surfaces of the bi-metal foil are bonded to e.g. 0.002 inch thick Kapton to form the flexible layer $L_1$. The top Kapton sublayer (not particularly shown as it is translucent) has a relatively small window at 144 (illustrated in dashed lines) that allows closer interaction between the recording zones and the magnetic medium. The bottom Kapton, sublayer 143, covers the entirety of the back of the bi-metal foil with the exception of a small area at the bottom side 145 of the common conductor portion 141.

The entire layered structure of FIG. 5 is intended to be wrapped around a small diameter (e.g. one inch) mandrel such that the recording zones 108 become readily accessible and the ends of the fingers of the recording elements meet nearly with the side 145 of common conductor 141. While the recording element fingers are shown temporarily connected via common piece 142, it is intended that this common piece be removed (e.g. by etching or scissoring at dashed line 140) in similar manner to the step in which the fingers of the recording elements become separated from one another.

The appropriately relatively long separated individual elements are thus able to be utilized as one-turn secondaries for miniature torodial current-boosting transformers. The secondary of each transformer is formed by passing the finger portion of a record element through the opening of a torodial transformer and connecting (e.g. by soldering) the end of the finger onto the back surface of common conductor 141 and 145, thereby creating a closed circuit.

In this design it will be appreciated that relatively high values of secondary resistance and inductance can prevent induction of the secondary current to the desired amplitude before magnetically saturating the cores of the transformers. Moreover, the transformers must be of appropriately small size in order to avoid encountering space problems. Therefore, reduction of total impedance of the secondary side of the transformers becomes highly desirable and indeed critical to the overall performance of the recording head. The uniformity of the impedance values of the individual elements also is critical, since, as hereinbefore discussed, uniformity is needed to maintain a substantially constant amplitude for the recording current. Thus, in the design of the bi-metal foil it is of major importance to pattern the foil in such a way as to maintain substantially uniform dimensions in length, width and thickness of the recording elements.

Figure 6A:
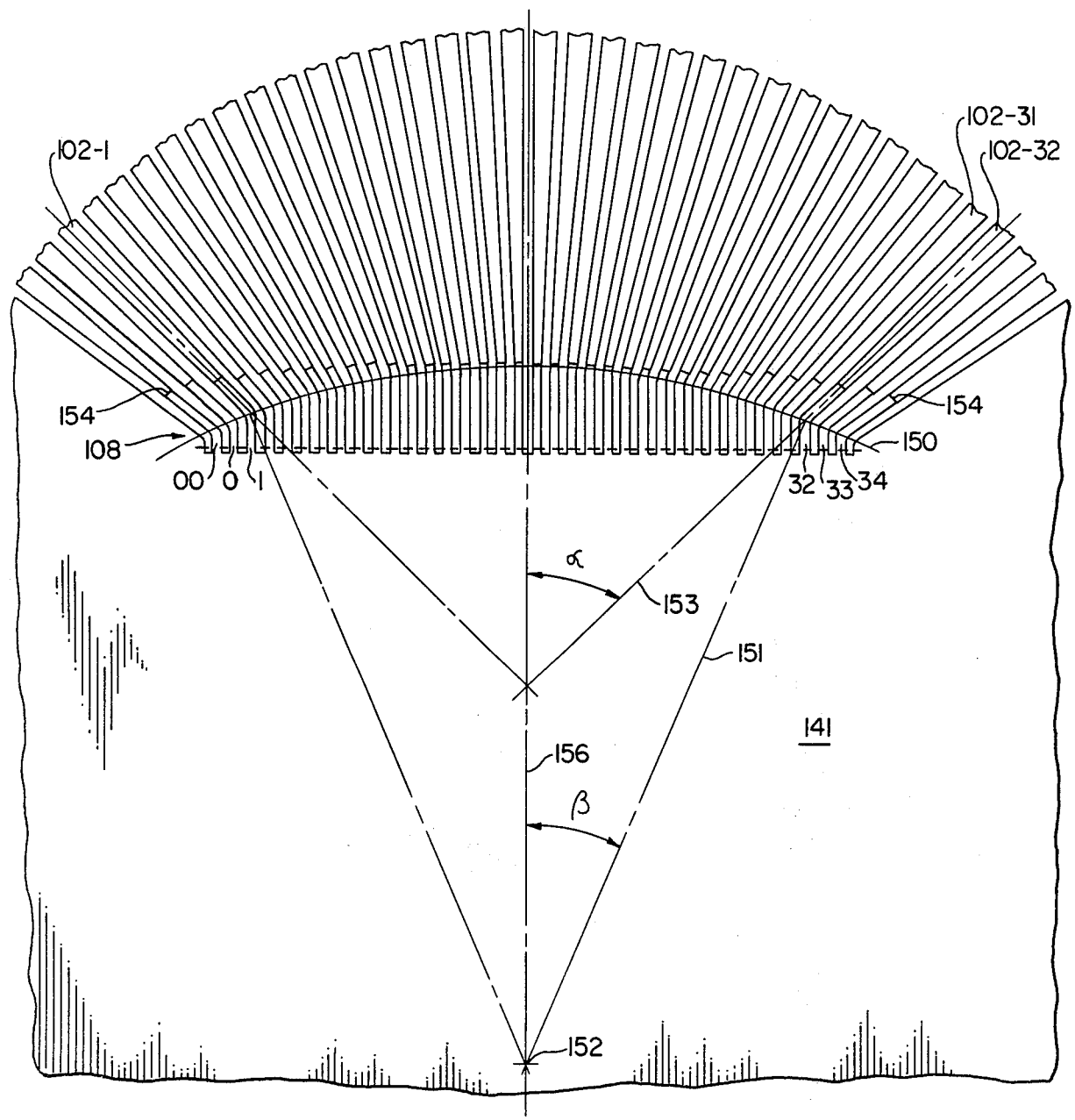
FIG. 6A is a greatly enlarged top view of the recording zone area of a bi-metal configuration of the type depicted in FIG. 5, illustrating in particular the features of arcuate angling and resistance compensation of the individual recording elements.

FIG. 6A shows an enlarged view of the recording zone area of the configuration of FIG. 5 (but for thirty-six elements in total), and in particular the detailed arrangements in connection with uniformly fanning out the recording elements with equal critical dimensions.

As shown in FIG. 6A, while there are thirty-six recording elements, the two recording elements at the extreme sides of the array are normally not utilized for magnetic recording. These four elements have been included in the fabrication to prevent "end effects" during the etching processes, thus ensuring uniformity of etching along the recording zone with regard to the elements (the thirty-two internal elements) which are intended for actual use.

As depicted in FIG. 6A the recording elements remain precisely parallel with each other from the common return 141 to a predetermined arcuate line 150. Fanning of the elements begins at the curved line 150, with each element having in addition an increasing taper as it radially extends outward. The fanning angle "$\alpha$" is defined by the intersection of the center axis (or symmetry line) of the array with a line extension 153 of the finger portion of the outermost recording element intended for recording use. Angle $\alpha$ is determined according to the overall design of the bi-metal array, and thus is based, for example, on restrictions concerning the required number of recording elements, the size of the current driving components which must be installed as closely as possible to the recording zone in order to minimize the associated circuit impedances, and other restrictions such as line resolution limitations of the printed circuit technology, etc. In practice $\alpha$ has ranged from less than 2° to 72.5°. It will be appreciated, however, that $\alpha$ can readily assume angles up to 90° for a single-sided fan configuration.

The radius of curvature 151 of the curved line 150 is determined in relation to the fanning angle $\alpha$. Generally, the center 152 of the curvature that defines radius 151 is determined by another angle $\beta$ which itself is defined by the intersection of the perpendicular center axis 156 (which includes point 152) and the radius 151 meeting the line 153 at the curved line 150. FIG. 6B shows in an enlarged view of a portion of a recording element the relationship between angles $\alpha$ and $\beta$. It is determined that $\alpha = 2\beta$. With this geometry the intercept of the straight portion of the elements with the fanned portion has essentially a constant width.

As shown in FIG. 6A and in greater detail in the enlarged view of FIG. 6C, each recording element extends from the recording zone with uniform and parallel edges (and uniform cross-sectional dimension) beyond the point where it begins to angle outwardly from the mid line 156 at the curved line 150, to a limit designated by the line 154 and then begins to progressively enlarge in width to the terminal point of the finger portion. To ensure uniform resistance from element to element in the vicinity of the recording zone, it is important to keep the "non-tapered" length "l" (FIG. 6C) of each element as constant as possible; that is, the length from the edge 155 of common conductor portion 141 to the line 154 marking the beginning of the enlarging taper portion for each element should be the same. Length l should be determined on the basis of the distance from edge 155 to curved line 150 for those recording elements closest to the mid line 156. This length should be as short as practically possible.

Figure 7:
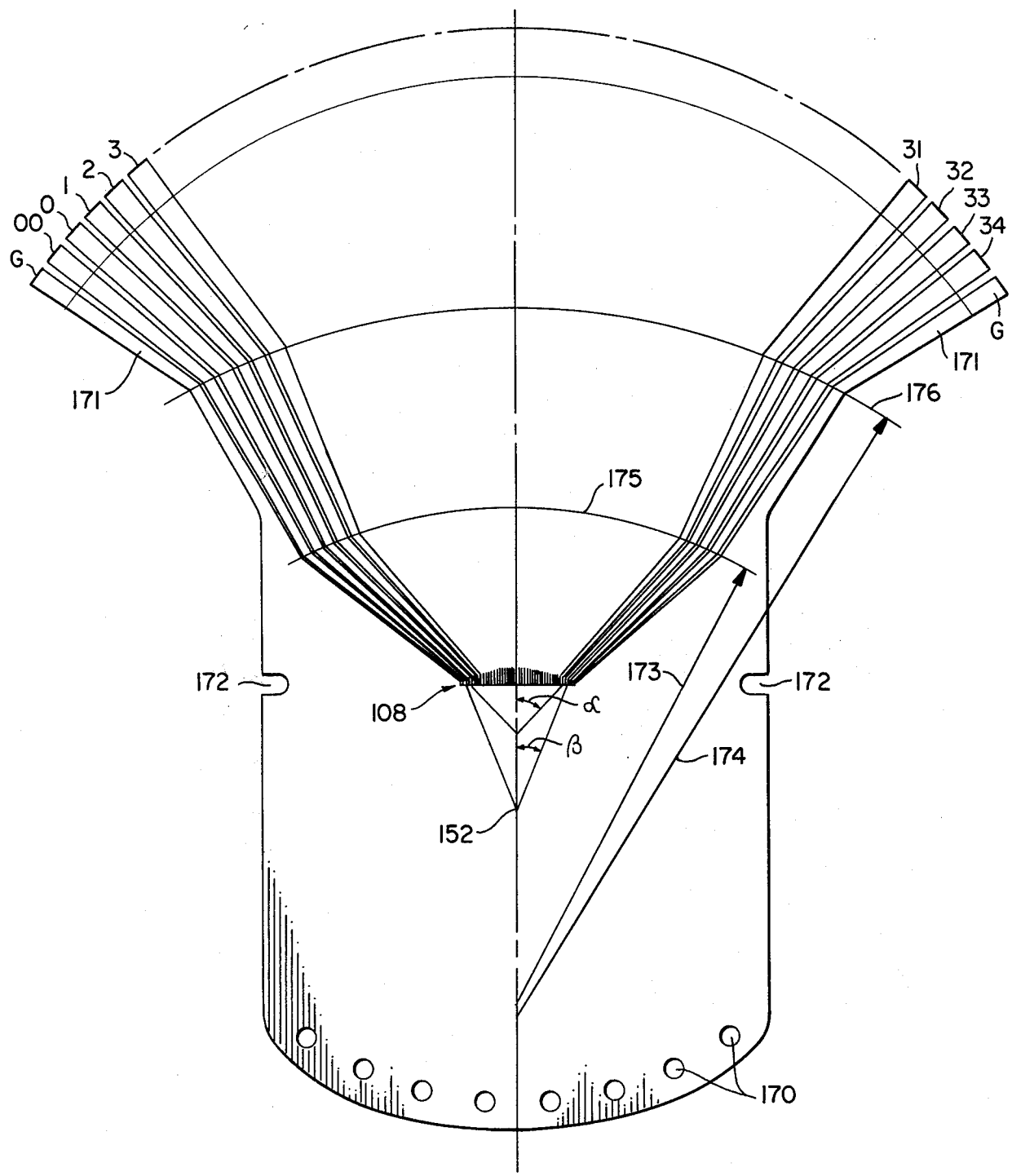
FIG. 7 illustrates in a top view an alternative configuration of a symmetrical one-sided fan structure for the bi-metal layer of FIGS. 2 through 4, having a somewhat condensed fan structure.

FIG. 7 shows an enlarged top view of an alternative bi-metal foil design, in this case for a recording head with thirty-two recording elements. Such a structure is particularly designed for implementation in conjunction with a pair of small printed circuit boards (not shown) arranged to include current transformers associated to the fingers of the recording elements and at least some of the driving circuitry components, as well as a multipin connector allowing proper termination to say a flat cable. The design concept is primarily directed, in addition to the within-discussed circuit inductance and resistance reducing aspects, toward reducing the overall size of the bi-metal foil layer $L_1$ (as compared for example with that of FIG. 5). Moreover, it is intended by this design to decrease the vulnerability of the bi-metal foil piece to permanent damage (since it is a very fragile piece) and to create an improved condition for uniformity of circuit impedance from recording element to recording element.

The above-mentioned pair of printed circuit boards is designed to include the common return paths as closely as possible to the main current-carrying conductors. It is intended that each board have an array of terminals (i.e. soldering pads) that are arranged such that sixteen of the recording elements (i.e. every other one) would meet these soldering pads to be permanently soldered. This bi-metal foil is to be bonded onto a mandrel having a convexly curved surface, for example with a one inch radius of curvature. The common return paths are provided by way of eight holes 170 and two narrow strips 171. A pair of notches 172, which are in precise alignment with the recording zone 108, is provided to mate with two precisely dimensioned holes on the mandrel to ensure proper alignment and installation of the bi-metal foil in relation with the rest of the system. The detail of the recording zone and its vicinity are substantially the same as that shown in FIGS. 6A through 6C.

In the design of this bi-metal layer, one of the measures taken to reduce circuit resistance is to initially allow the recording elements to fan-out at a substantially higher rate (as compared for example with that of FIG. 5), therefore, increasing the average cross-sections of the elements. However, to keep the size of the circuit board small and to have the fingers of the recording elements meet with the pattern of the circuit board, the fanning rate is readjusted at the curved lines 175 and 176 corresponding with the radius of curvatures 173 and 174 respectively. Thus, this record head design comprises a relatively substantially smaller bi-metal foil, intended to interface with a pair of rigid printed circuit boards which support the circuit components and terminals substantially consistant with standard printed circuit board fabrication methods, which bi-metal foil configuration allows for substantially reduced current-carrying conductor path lengths and separations leading to reduced circuit impedances, and substantially uniform circuit impedances associated with the recording elements thus permitting constant current operation for high-quality recording.

Figure 8:
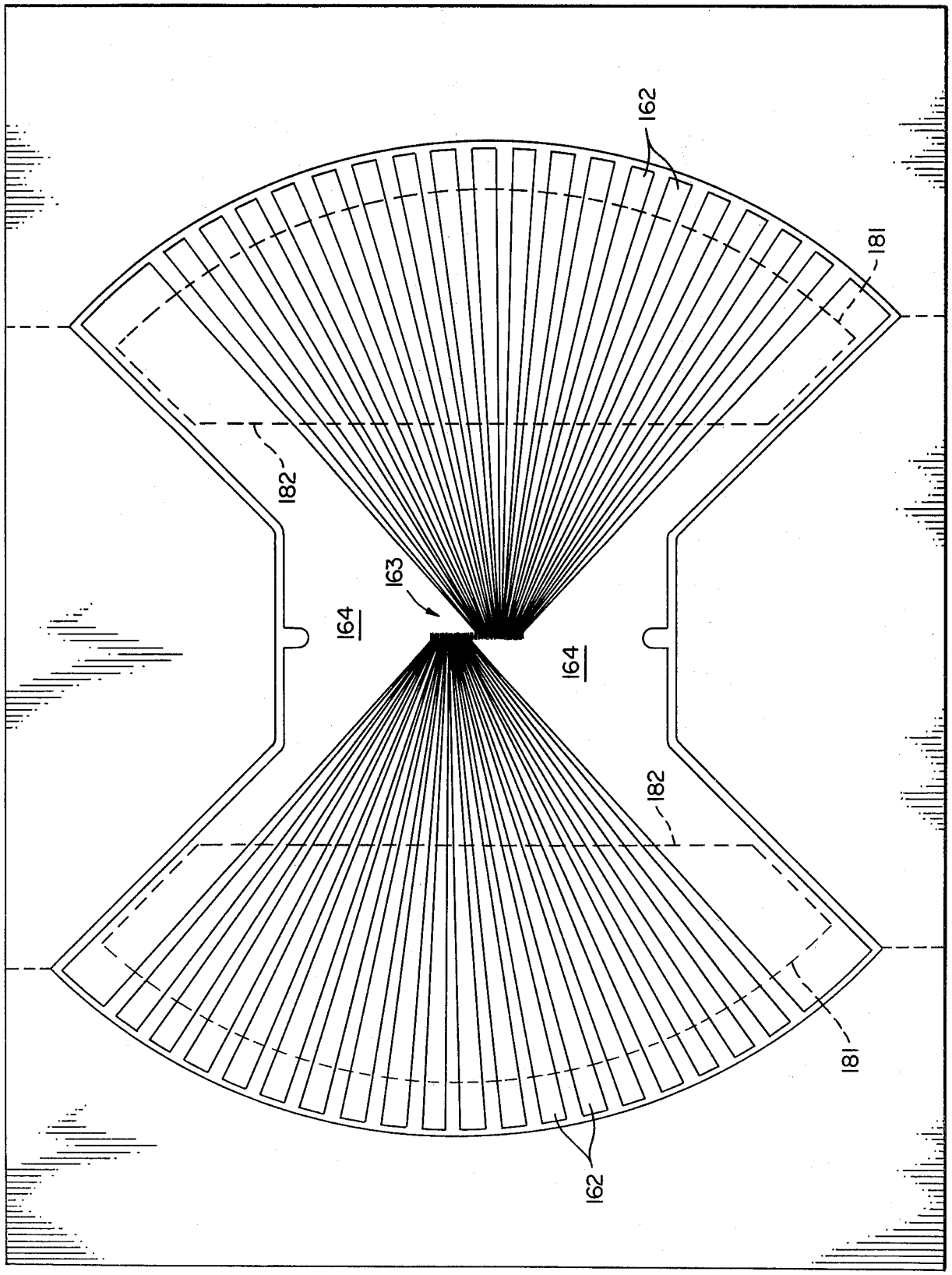
FIG. 8 illustrates in a top view a further alternative embodment of the bi-metal layer of FIGS. 2 through 4, in the form of a two-sided fan configuration complete with bordering commons.

FIG. 8 depicts another design for the bi-metal foil, again having thirty-two recording elements. This design has the various electrical and physical features of the configurations shown in FIGS. 5 through 7 with the additional advantage of allowing mass termination of the recording elements to the associated dual printed circuit boards. The structure comprises the fingers 162 and recording zones 163 of the individual recording elements as well as the common returns 164. As depicted in FIG. 8 the recording elements are divided into two groups which are adjacent to one another at the recording zone, whereby the elements extend radially in opposite directions. This arrangement provides an availability of more space for fanning-out and thus allows a higher rate of increase in the width or the cross-section of the record elements which in turn reduces the electrical resistance of the elements. The position of the recording elements may be secured by including a supporting member 182, such as silicone tape or bonded Kapton, to the foil just before the completion of the etching process utilized. In this way the recording elements are held in position and are thus able to readily mate with the soldering pads of the printed circuit boards. With the soldering pads of the printed circuit boards and the ends of the recording element fingers properly prepared, each of the two groups of recording elements is able to be mass soldered to its respective printed circuit board.

Figure 9:
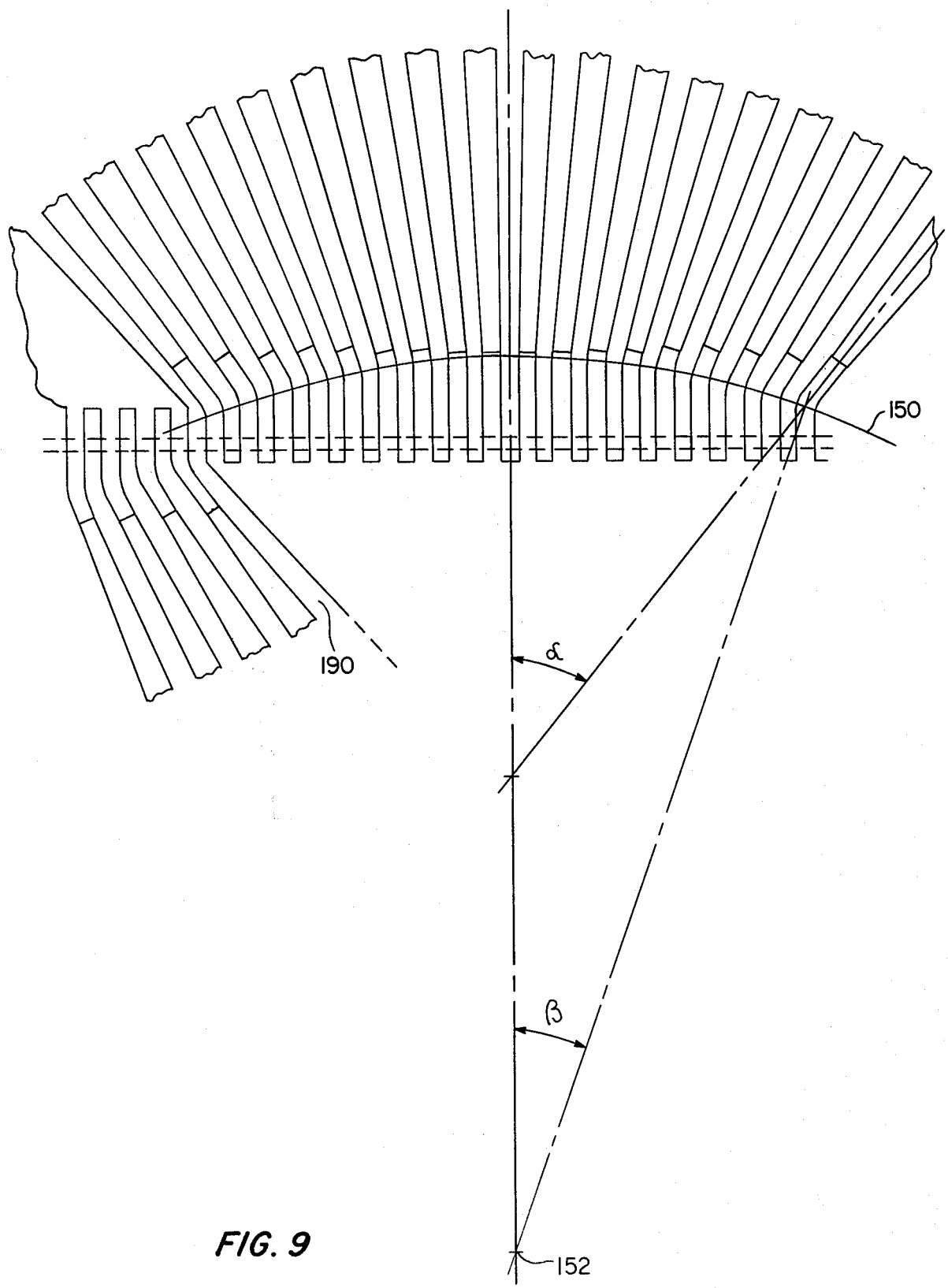
FIG. 9 is a greatly enlarged top view of a portion of the recording zone area of the configuration depicted in FIG. 8.

The detailed arrangement of the recording zone and vicinity of FIG. 8 is shown in the enlarged top view of FIG. 9. It should be noted that the relationship between the angles $\alpha$ and $\beta$ and the design details are here the same as previously discussed and illustrated in connection with FIGS. 6A through 6C.

In this design, as shown in FIG. 9, the common returns are electrically isolated by the completely etched groove 190. Thus, this design has the additional feature of permitting a $2 \times 16$ multiplexing of the recording currents.

Figure 10:
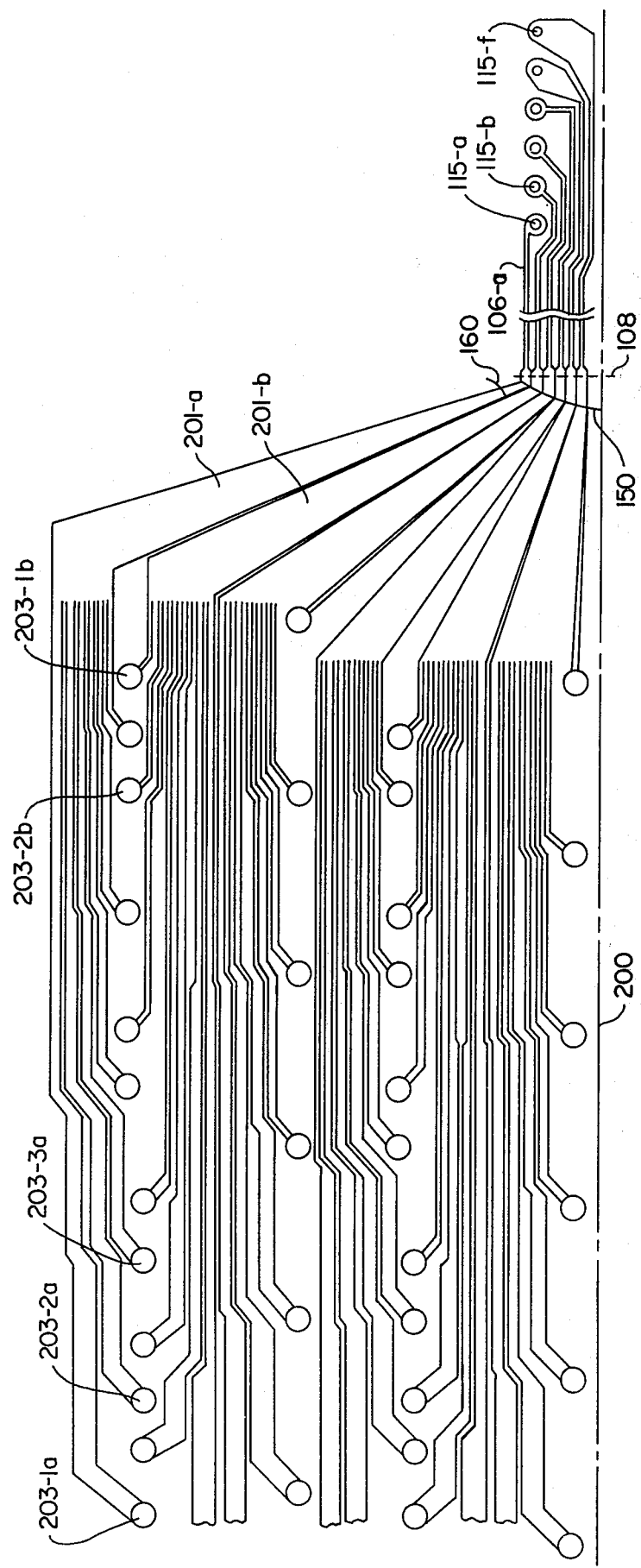
FIG. 10 is a top view of a more complex, single-sided, fan-configured bi-metal layer with a substantially greater number of recording elements, in which the recording elements are sub-divided into groups, each group having its own common, and illustrating in particular the printed circuit pattern comprising surface sub-layer 131 of FIG. 2.

FIG. 10 dipicts a somewhat enlarged top view of a detailed arrangement of the bi-metal layer $L_1$ for an eighty-two element recording head. The depicted arrangement is symmetrical around an axis 200, and thus only the one half of the design is shown. Utilization of a multiplexing scheme in this design provides twelve groups 201 of recording elements, with six or seven elements to a group, depending on the group.

The recording elements of each group (e.g. group 201-a, 201-b . . . ) extend in parallel at first away from the recording zone area, then radially, and upon reaching a predetermined distance they then begin to extend outwardly substantially in parallel with the axis 200. FIG. 10 illustrates in particular the detailed arrangement of the recording elements from the point the driving current enters the bi-metal layer, say at soldering hole 203-2a for the recording element having recording zone 108-2a, to the solder connections 115 leading to layer $L_2$. For this particular recording element the driving current would flow, when the element is activated, from solder point 203-2a, along the finger portion 102-2a to the point at arcuate line 150 where the conductive path becomes exactly parallel with the other recording elements as it approaches the recording zone 108.

Passing through the recording zone, the current enters its group common 106a and from there terminates to the associated solder point 115a leading to layer $L_2$. Thus every recording element terminates to a diode's lead (say 203-2a) at one end and to its associated common return 106.

Figure 11:
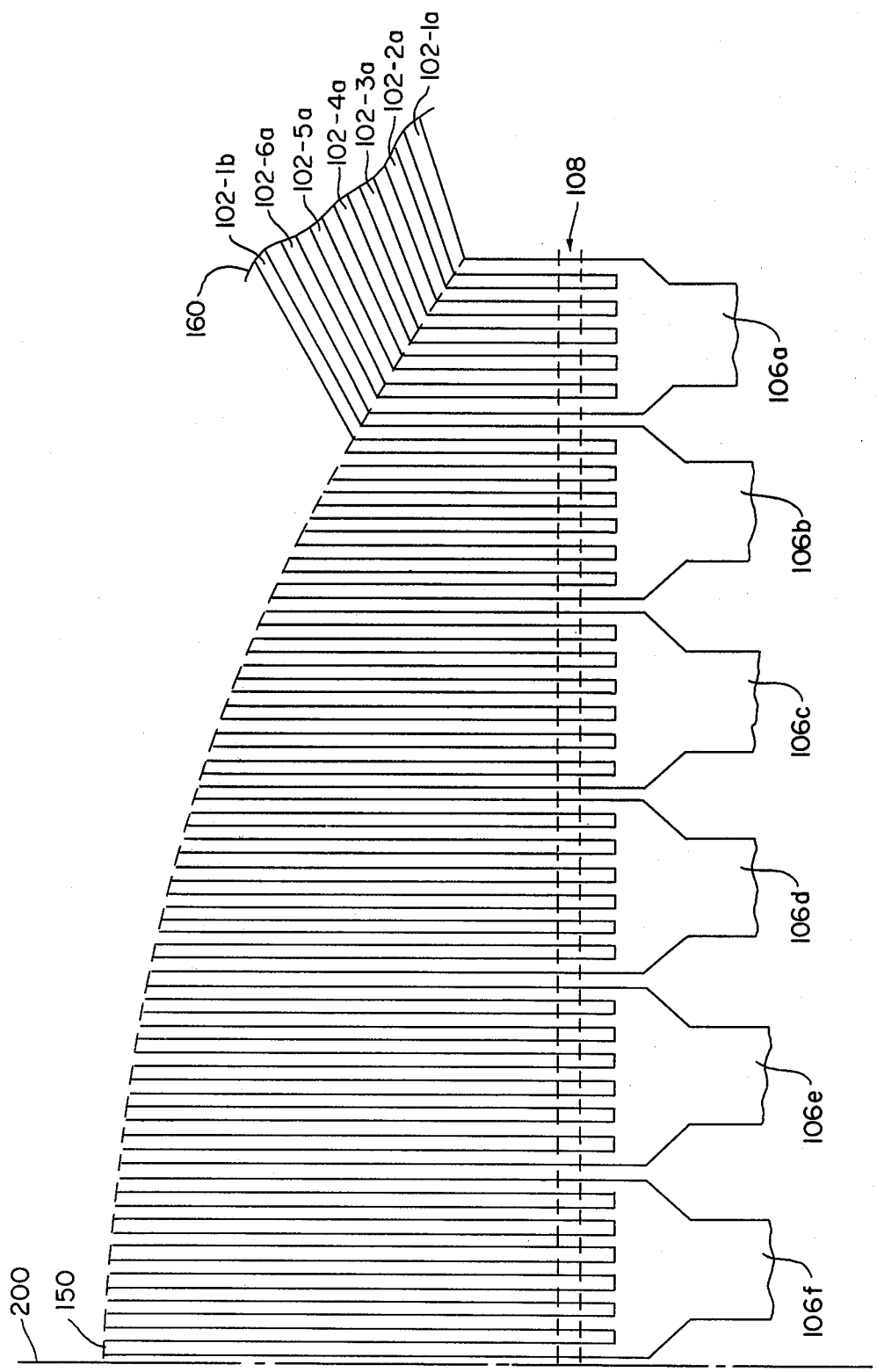
FIG. 11 is a greatly enlarged top view of a portion of the recording zone area of the configuration depicted in FIG. 10.

FIG. 11 illustrates an enlarged view of the detailed arrangement of the array of the recording zones 108 and the common returns 106 of FIG. 10. In particular, the curved line 150 defining the points at which the fanning-out of the recording elements begins is also illustrated.

Figure 12:
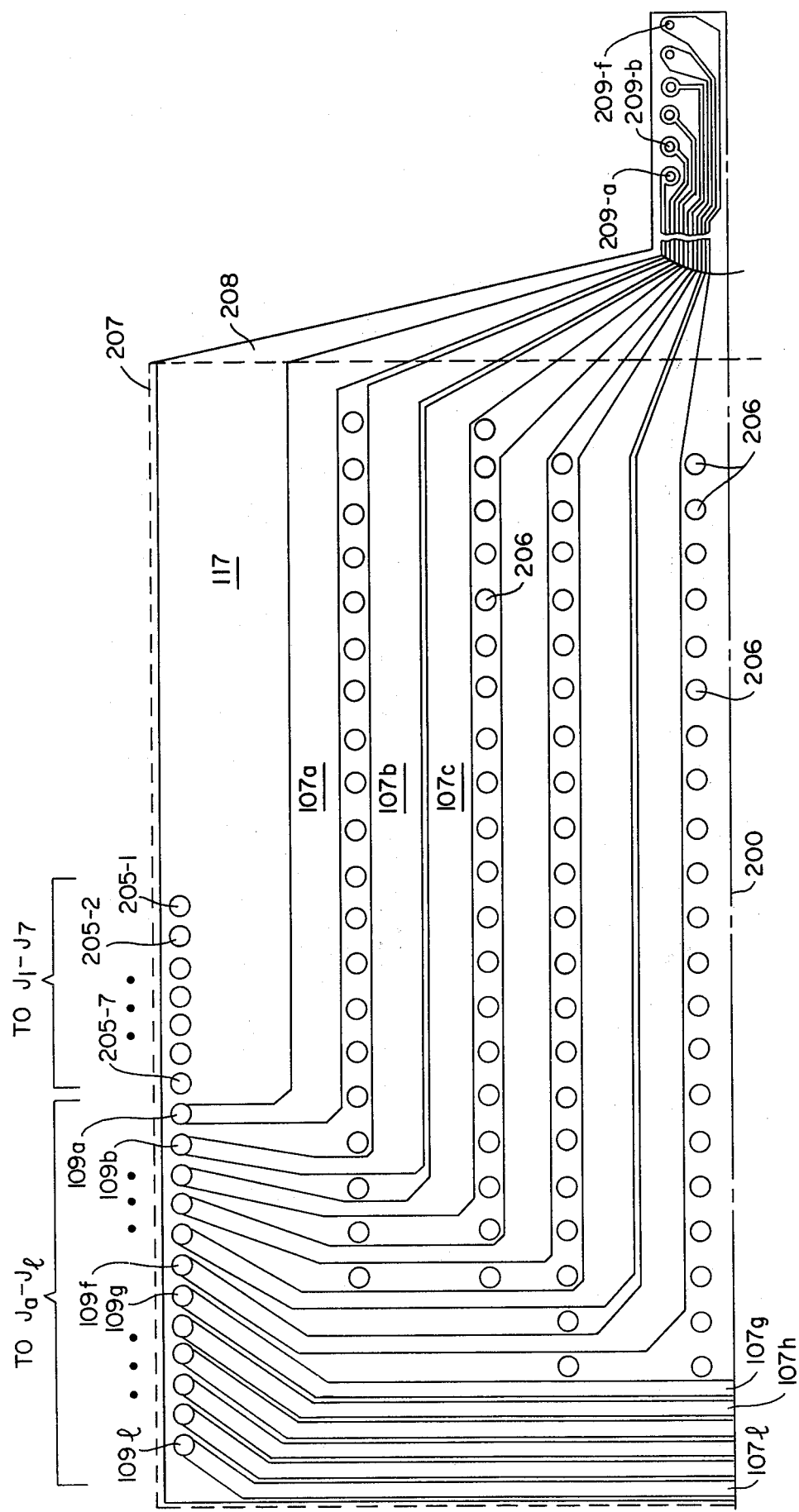
FIG. 12 is a bottom view of the printed circuit surface sub-layer 107 counterpart of the complex, one-sided fan configuration depicted in FIG. 10.

FIG. 12 illustrates a detailed arrangement of the common returns 107 that are supported and bonded to Kapton sub-layer 133. Since the pattern illustrated is largely symmetrical about axis 200, only one half of the design is shown. In this figure, the soldering holes 209 are patterned as a mirror image of the soldering holdes 115 shown in FIG. 10, and thus a soldering operation connects the two (see also FIGS. 2 and 3). As depicted in FIG. 12 the common returns extend from the holes 209 to another set of soldering holes 109a, 109b, . . . 109l which are provided for soldering to the properly designated pins of the multiterminal connector. It should be noted that the soldering holes 109g, . . . 109l correspond with the six common returns arranged on the non-illustrated half of this patterned sub-layer. As shown, additional relatively large blank holes 205 and 206 are provided. These holes are arranged for the other pins of the multiterminal connector and the leads of the diodes respectively, to pass through.

As it has been previously indicated, the ground plane layer $L_4$ and the rigid printed circuit board layer $L_3$ are positioned on top of the layer $L_1$ which contains the bi-metal foil shown in FIG. 10.

In assembling the laminated structure it is contemplated that tin plating (not shown) is approximately provided inside the holes of the rigid board. Moreover, the diameters of the holes 205 and 206 are substantially larger than the thickness of the Kapton and conductor sub-layers of layers $L_2$ and $L_4$. With the pins and the diode leads passing through the holes of the various layers, as is conceptually particularly illustrated in FIG. 2, and specifically the holes 109, 205 and 206, all of the pins and leads can easily be appropriately flow-soldered from the back of the layer $L_2$.

In FIG. 12 the outline 207 corresponds with the outer dimensions of the rigid board layer $L_3$. Therefore, the portion 208 of layer $L_2$ that extends beyond the limits of rigid layer $L_3$ remains as a flexible member even after lamination and soldering. Thus the portion of layers $L_1$ and $L_2$ extending beyond the rigid layer $L_3$ can be wrapped around and affixed to an appropriately curved surface, i.e. a mandrel, as illustrated, for example, in FIG. 3. As such, there is provided a full recording head structure with eighty-two (in this example case) recording elements, multiplexed in terms of a 7×12 matrix (two groups of which have only six elements) with full provisions for inclusion of each of the "blocking" diodes, and including the multipin connector for proper terminations to the rest of the driving circuitry.

What is claimed is:

1. In a recording system having recording circuitry, the integral structure comprising a first member defining a multiplicity of recording elements arranged substantially in parallel with one another, each recording element having a defined recording zone of minute size forming a part of a first surface of said first member, with the recording zones of said recording elements being predeterminably arranged relative to one another; and a second member having a first surface which is contiguous at least in part with said first member, said second member also having a ground plane on a second surface thereof with said ground plane positioned to substantially reduce inductance in the recording circuitry, and wherein the electrical resistance and inductance within said integral structure is substantially the same for each recording element.

2. A system according to claim 1, wherein said first member has a second surface for providing at least one group of the recording elements with a common which is in electrical contact with at least one terminal associated to said second member.

3. A system according to claim 2, wherein said second member includes means for mounting at least a portion of the components comprising the recording circuitry.

4. A system according to claim 3, wherein the first surface of said second member is contiguous at least in part with the first surface of the first member.

5. A system according to claim 1, wherein said ground plane is parallel with the first surfaces of said first and second members.

6. A system according to claim 4, wherein said second member has a second surface, and wherein the recording circuitry components associated to the second member which have substantial three-dimensional shape are mounted to said second surface of said second member.

7. A system according to claim 2, wherein said first member is comprised of a bi-metal layer defining the recording elements and said first surface, and at least one conductive layer bonded to but selectively electrically insulated from said bi-metal layer, said conductive layer providing at least in part said second surface of said first member.

8. A system according to claim 7, wherein said second member is a printed circuit board structure at least in part defining the electrical path of the recording circuitry associated to each recording element of said first member, wherein the part of each such electrical path defined by said printed circuit board structure substantially equalizes the resistance and inductance of the electrical path from recording element to recording element.

9. A system according to claim 8, wherein said printed circuit board structure is comprised of a pair of printed circuit boards each of which is respectively dedicated to preselected ones of the recording elements.

10. A system according to claim 9, wherein said printed circuit boards are arranged substantially parallel to one another and are respectively dedicated to every other recording element.

11. A system according to claim 8, where the printed circuit board structure has conductive paths on at least two surfaces thereof and the part of the electrical path for each recording element associated to the second member may include conductive paths on both of said surfaces of the printed circuit board structure, in order to substantially equate the electrical circuit resistance for each recording element within said integrated structure.

12. A system according to claim 8, wherein said second member includes a ground plane and wherein at least a portion of the first surface of the second member is bonded to the first surface of the first member.

13. A system according to claim 12, wherein the electrical path for each recording element extends from a conductive path of pre-established resistance and inductance of said second member, through the second member to the first surface of the first member and returns to the second member via said conductive second surface of said first member.

14. A system according to claim 13, wherein the electrical path for each recording element passes through the ground plane as it extends back and forth between said first and second members.

15. A system according to claim 1, wherein said integrated structure includes a support structure shaped to locate the recording zones on a convexly curved portion of said first member.

16. A system according to claim 15, wherein the recording zones of the recording elements are arranged in a linear array.

17. A system according to claim 2, wherein said second member includes means for facilitating multiplexing of said recording elements.

18. A system according to claim 1, wherein the substantial equality of the electrical resistance for each recording element within the integrated structure is primarily established by preselecting at least the length dimension of a predetermined portion of the recording element electrical path on said second member.

19. A system according to claim 2, wherein the recording elements are divided into two major groups of substantially parallel configuration, with the recording zones of the recording elements of both groups forming a combined linear array and the common for one group being situated adjacent to the substantially parallel configuration of the other group.

20. A system according to claim 2, wherein the recording elements are divided into two major groups with each major group being further divided into a plurality of minor groups.

21. A system according to claim 20, wherein the minor groups are arranged to be adjacent to one another and the individual recording elements within each minor group are substantially parallel to one another.

22. A system according to claim 21, wherein the recording zones of the recording elements of the major groups are arranged so as to combine to form at least one linear array of recording zones.

23. A system according to claim 22, wherein each said minor group has a common return, with the common returns of the minor groups for each major group being arranged substantially in parallel, such that the group of common returns for one major group is located adjacent to the other major group of recording elements.

24. A system according to claim 1, 2, 7, 19 or 23, wherein each recording element of said first member is constructed and configured to provide substantially the same electrical resistance.

25. A recording head according to claim 8, wherein said electrical path of each of said recording elements extending to said recording zones are, in the vicinity of the recording zones, angled outwardly, each at a predetermined acute angle relative to the mid-line of the fan structure, the angles associated to said recording element varying from near 0° for the recording element(s) proximate the mid-line to a selected maximum angle $\alpha$.

26. A recording head according to claim 25, wherein $\alpha$ may be $3° \leq \alpha \leq 72.5°$.

27. A recording head according to claim 26, wherein said fan is symmetrical about the mid-line thereof.

28. A recording head according to claim 27, wherein the angle $\alpha_1$ associated to a first recording element conductive path is less than the angle $\alpha_2$ associated to the recording element conductive path which is contiguous to said first path but further away from said mid-line.

29. A recording head according to claim 28, wherein the location of the angle $\alpha$ of each of the recording element conductive paths forms an arcuate locus of points which is symmetrical about the mid-line with the end points of such arcuate locus belonging to the outermost recording element conductive paths, said locations being closest to the recording zone for the outermost recording elements and said arc having its zenith at the mid-line.

30. A recording head according to claim 29, wherein the cross-sectional dimension of the recording element conductive path remains the same in the vicinity of said angle $\alpha$.

31. A recording head according to claim 30, wherein the cross-sectional dimension for each recording element conductive path is substantially unchanged from the recording zone for a selected distance therefrom, and is substantially the same dimension for each recording element.

32. A recording head according to claim 3, wherein for each recording element the portion of said conductive path extending away from the portion thereof having substantially unchanged cross-sectional dimension continuously and progressively widens to a terminal distance.

33. A recording head according to claim 32, wherein each recording element has in the conductive path leading to the recording zone a plurality of angular bends to effect a condensed fan structure.

34. A recording head according to claim 33, wherein said first member defines at least two groups each comprising a multiplicity of recording elements extending substantially in parallel, the two groups being arranged such that the common return for the one is adjacent to the individual conductive paths portion of the other.

35. A multiplexible recording head comprising a four-layer laminate structure mountable on a supporting substrate, the array of recording elements of the recording head forming a flexible, uniquely arranged first layer thereof, the return paths of the recording elements comprising a flexible second layer and substantially reducing the recording element circuit inductance, the third layer thereof comprising substantially a printed circuit board structure for mounting for the blocking diodes and the conductive paths of the associated multiplexing scheme, and the fourth layer comprising a ground plane located between the first and third layers and insulated therefrom for further reducing the inductance associated to the circuitry of the first layer and for minimizing the circuit inductance of the third layer.

* * * * *